United States Patent Office 3,781,255
Patented Dec. 25, 1973

3,781,255
PROCESS FOR THE SUSPENSION OF POLYMERIZATION OF VINYL CHLORIDE
Thomas Balwe, Johann Bauer, and Alex Sabel, Burghausen, Upper Bavaria, Germany, assignors to Wacker-Chemie GmbH, Munich, Germany
No Drawing. Filed July 28, 1970, Ser. No. 59,022
Claims priority, application Germany, Aug. 8, 1969, P 19 40 475.2
Int. Cl. C08f 3/22
U.S. Cl. 260—87.1    1 Claim

ABSTRACT OF THE DISCLOSURE

Process for polymerizing vinyl chloride, and for copolymerizing vinyl chloride and up to 30% by weight of other ethylenically unsaturated monomers in aqueous phase containing a suspension agent, which comprises heating the suspension to a temperature of 30 to 90° C., under a pressure of up to 15 atmospheres, in the presence of a mixture of acetyl cyclohexyl sulfonyl peroxide and a perester of branched carboxylic acids and α-branched hydroperoxides of the general formula

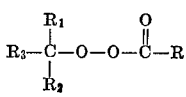

where R represents branched alkyl groups with 3 to 18 C atoms, $R_1$ hydrogen or alkyl groups with 1 to 4 C atoms, $R_2$ alkyl groups with 1 to 4 C atoms and $R_3$ straight-chain or branched alkyl groups with 1 to 18 C atoms.

---

For the suspension polymerization of vinyl chloride numerous peroxide catalysts have been proposed in the past. However, for large-scale production the use of dilaurylperoxide is preferred. There it has been found that the product's properties, such as grain size, distribution of grain size, porosity, K-value, can be influenced by a change of the catalyst only slightly or not at all. These properties are determined mainly by the reaction conditions such as temperature, protective colloid, regulator, stirring conditions and conversion.

Because of a relatively high half-life period dilaurylperoxide as a catalyst for vinyl chloride suspension polymerization involves very long reaction periods. This disadvantage cannot be eliminated satisfactorily by increasing the concentration, because the polymerization speed within the customary temperature range from 45 to 65° C. is uneven. Toward the end of a polymerization catalyzed by dilaurylperoxide, after about 70% has been transformed, a more or less pronounced reaction maximum occurs, depending on the concentration (referred to hereinafter as end reaction). The cooling capacity must be adjusted to this maximum of reaction heat, to avoid the necessity for an uneconomical decrease in pressure.

With the aid of so-called rapid catalysts, like dialkylperoxide-dicarbonates and acetyl cyclohexane sulfonyl peroxide which are characterized by low half life periods, one can gain considerable time. However, the introduction of such rapid catalysts in large-scale production causes difficulties, because here, too, irregular reaction speeds must be taken into account. Dialkylperoxide dicarbonates, similar to dilaurylperoxide, show a pronounced end reaction as the concentration increases, while acetyl cyclohexane sulfonyl peroxide shows a very strong starting reaction at polymerization temperatures above 45° C. Here the radical supply at the beginning of the polymerization is very high, but it soon subsides during the later course.

Practice has shown that the beginning of the polymerization is very lively, and that during the later course of the reaction, it can die out because of a lack of radical supply. In regard to a good reaction conversion, however, a good minimum radical supply is required during the entire duration of the polymerization. On the other hand, the quantity of the catalyst is limited by the difficulty of dissipating the created polymerization heat. As the size of the autoclave increases, the range of a useful catalyst concentration always decreases, because the cooling surface of an autoclave cannot increase at the same pace as the volume of the autoclave. For the economical large-scale production of suspension polyvinyl chloride it is of decisive importance, however, that neither an incomplete transformation occurs due to the premature drying of the reaction, not a premature expansion becomes necessary because of an intense reaction due to a great increase in pressure.

There also are other reasons for desiring approximately constant polymerization speed in large-scale production. An even reaction contributes considerably to the working safety of the process. Also, the quality of the polyvinyl chloride is improved by the even course, because the danger of local overheating caused by quick temperature changes is eliminated, and the quick heat removal is no longer hampered by the increasing viscosity of the reaction substance and the formation of a heat-insulating crust. This reduces the side reactions like ramification, lattice-like polymerization, grafting, which in insufficient thermal stability show up as "fisheye" polymers and horny products.

To eliminate such disadvantages, catalyst combinations have been described in connection with suitable protective colloid systems, but these are not entirely satisfactory. Thus a combination of acetyl cyclohexane sulfonyl peroxide with dilaurylperoxide shows a strong heat tone which subsides quickly and increases strongly again only towards the end of the reaction. This creates two temperature peaks which make an even load of the cooling capacity of the autoclave impossible. The combination of acetyl cyclohexane sulfonyl peroxide with azoisobutyric acid dinitrile shows a similar temperature profile.

Moreover, when using the peroxides known till now, or their combinations, solid, clinging crusts of polymers are formed on the surface of the autoclave, which must be removed before the next polymerization load. This may cause considerable delays because, depending on the conditions, the cleaning of an autoclave with volumes of 12 to 25 cu. m. will take 2 to 3 working hours. With a polymerization period of 20 hours a two-hour cleaning period represents a 10% time loss. If the polymerization period is reduced to 10 hours by means of the rapid catalysts mentioned above, the cleaning period will represent 20% of the time. This shows that the volume-time yield of the autoclave depends considerably on the clinging properties of the crusts during the polyvinyl chloride polymerization with peroxides.

We have now discovered a process for the polymerization of vinyl chloride, or for the copolymerization of vinyl chloride with up to 30% of other ethylenically unsaturated monomers in aqueous phase containing suspension-promoting agents and in the presence of peroxides, which avoids the above-mentioned disadvantages. The process is characterized by the fact that we work at a temperature of 30 to 90° C., preferably 40 to 65° C., under a pressure of up to 15 atmospheres, using a mixture of acetyl cyclohexyl sulfonyl peroxide and a perester of branched carboxylic acids and α-branched hydroperoxides of the general formula

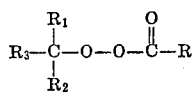

where R represents branched alkyl groups with 3 to 18 C atoms, $R_1$ hydrogen or alkyl groups with 1 to 4 C atoms, $R_2$ alkyl groups with 1 to 4 C atoms and $R_3$ straight-chain or branched alkyl groups with 1 to 18 C atoms.

When using said new catalyst combination, the course of the polymerization is even during almost the entire reaction period. This makes it possible to use the full cooling capacity of the autoclave all the time during the conversion without overheating the reaction substance or making a premature blowing off of the monomer vinyl chloride due to excessive temperature increase. These advantages result in a better utilization of the autoclave. Moreover, the polyvinyl chloride produced in this manner shows very good heat stability, and a minimum of stiples, and is therefore suitable for the making of foils and hollow body processing.

Moreover, it is surprising that when using the catalyst combination of the invention, the adhesive force of the crusts to the autoclave walls is particularly low. This results in a time saving of 30 to 50% when cleaning the autoclave, compared with polymerizations with previously known peroxides or their combinations under similar conditions. This makes a greater utilization of the autoclave possible.

The catalysts are used in total quantities of 0.005 to 1% by weight, preferably 0.01 to 0.1% by weight, referred to the monomers. Here acetyl cyclohexyl sulfonyl peroxide is used with peresters of branched carboxylic acids and α-branched hydroperoxides, in a molar proportion of 3:1 to 1:5, preferably 2:1 to 1:4.

Suitable peresters are for instance:

1,1,3,3-tetramethyl butyl-peroxi-2-ethyl-butyrate,
1,1,3,3-tetramethyl butyl-peroxi-2-methyl-pentanoate,
1,1,3,3-tetramethyl butyl-peroxi-2-ethyl-hexanate,
1,1,3,3-tetramethyl butyl-peroxi-neoheptanoate,
1,1,3,3-tetramethyl butyl-petoxi-isobutyrate,
1,1,3,3-tetramethyl butyl-peroxipivalate,
tert.-butyl-peroxipivalate.

Also suitable are peresters of versatic acids and α-branched hydroperoxides or the t-butylester of the 3,5,5-trimethyl hexane per acid. The catalysts can be put in as a mixture in advance, or they can be continuously added during the polymerization. On the other hand, it is also possible to put in the catalysts' components separately or add them during the polymerization.

The suspension agents are added in quantities of 0.08 to 1% by weight, referred to the percentage of water, for instance polyvinyl alcohol which may still contain up to 40% acetyl groups, cellulose derivatives like methyl cellulose, carboxymethyl cellulose, hydroxyethyl cellulose, hydroxypropyl cellulose, as well as copolymerizates of maleic acid or its semi-esters with styrol. Moreover, one can add small quantities of anionic, cationic, amphoteric or non-ionic emulsifiers, to the suspension system. One can also use buffer substances like sodium bicarbonate, soda, calcium carbonate, alkali acetates, alkali phosphates and molecular weight regulators like aliphatic aldehydes with 2 to 4 carbon atoms, chlorinated hydrocarbons like di- and trichlorothylene, chloroform and mercaptane.

Other ethylenic unsaturated monomers that are suitable, for instance, are vinyl halides like vinyl fluoride, vinylidene fluoride, vinylidene chloride; vinyl esters like vinyl acetate, vinyl propionate, vinyl butyrate, vinyl-2-ethyl hexanate, the vinyl esters of versatic and isotridecanoic acid; vinyl ether; unsaturated carboxylic acids and their esters like acryl-, methacryl-, fumaric and maleic acid mono- or diesters of mono- or dialcohols with 1 to 10 carbon atoms, acrylnitrile, styrol and olefines, like ethylene, propylene, butylene. The monomers can be put in first or they can be dosaged continuously.

The monomer water proportion is not of decisive importance. As a rule the percentage of monomers is 10 to 60% by weight of the total quantity of water and monomers. Also, one can add water by dosages during polymerization.

The polymerization is carried out in closed vessels in aqueous phase, where generally polymerization is under the autogenous pressure of the monomers. However, one can also use an overpressure of up to 15 atmospheres. The reaction vessel contains a mixing device and preferably deflection sheets or flow interceptors to assure an intensive mixing action. As a rule jacketed autoclaves are used, which assures intensive cooling.

The percentages and parts shown in the examples are weight data.

EXAMPLE 1

In a V2A mixer autoclave various polymerization charges are placed according to the basic prescription given below, and the catalyst combinations are varied.

Basic prescription: 62 parts fully desalted water and 38 parts vinyl chloride are heated together with the catalyst to 54° C. under stirring. The aqueous phase contains 0.15% of medium viscous methyl cellulose and 0.015% sodium bicarbonate dissolved.

The pressure, the polymerization temperature and the temperature of the heating and cooling water circulation are continuously measured by a recorder during the entire reaction period. The heating/cooling water circulation is controlled in such a manner that the polymerization temperature is kept constant independently of the prevailing polymerization heat. Thus the course of the temperature of the heating/cooling system gives a picture of the polymerization process.

The tests 1 to 6 in Table 1 have been carried out with the catalyst combinations of the invention. For comparison, known catalyst combinations were used in tests 7 to 12. As a measure for the even polymerization speed the temperature differences between the heating and cooling water temperature and the polymerization temperature are stated. Here the terms "Start," "Middle" and "End" are used. These denote the temperature peaks within the first ("start") and the last ("end") reaction hour as well as the minimum temperature approximately in the middle of the reaction period ("middle"). In order to illustrate the temperature changes, these are indicated by ΔT between "start" and "middle" and also between "middle" and "end." The reaction was terminated every time after a pressure decrease by 1 atmosphere. The consequence was that the reaction conversions are all around 85%.

TABLE 1

| Test | Percent catalyst[1] | | | | | °C., difference cooling water/polym. temp. | | | | | Reaction period (hr.) | Conversion per time (percent hr.$^{-1}$) |
|---|---|---|---|---|---|---|---|---|---|---|---|---|
| | ACSP[2] | TBPP[2] | DLP[2] | ABN[2] | Total | Start | ΔT | Middle | ΔT | End | | |
| 1 | 0.01 | 0.01 | | | 0.02 | 6.0 | −2.0 | 4.0 | +4.5 | 8.5 | 11.2 | 7.6 |
| 2 | 0.015 | 0.01 | | | 0.025 | 9.0 | −2.5 | 6.5 | +4.0 | 10.5 | 9.2 | 9.2 |
| 3 | 0.02 | 0.01 | | | 0.03 | 10.0 | −3.0 | 7.0 | +4.0 | 11.0 | 7.2 | 11.8 |
| 4 | 0.025 | 0.01 | | | 0.035 | 13.0 | −3.0 | 10.0 | +3.5 | 13.5 | 5.4 | 15.7 |
| 1 | 0.01 | 0.01 | | | 0.02 | 6.0 | −2.0 | 4.0 | +4.5 | 8.5 | 11.2 | 7.6 |
| 5 | 0.01 | 0.02 | | | 0.03 | 7.0 | −0.5 | 6.5 | +4.5 | 11.0 | 8.0 | 10.6 |
| 6 | 0.01 | 0.03 | | | 0.04 | 8.0 | +1.0 | 9.0 | +5.5 | 14.5 | 6.5 | 13.1 |
| 7 | 0.01 | | 0.02 | | 0.03 | 5.5 | −3.5 | 2.0 | +5.0 | 7.0 | 18.5 | 4.6 |
| 8 | 0.02 | | 0.02 | | 0.04 | 9.0 | −5.0 | 4.0 | +4.5 | 8.5 | 16.4 | 5.7 |
| 9 | 0.03 | | 0.02 | | 0.05 | 15.0 | −5.0 | 10.0 | +7.0 | 17.0 | 12.7 | 6.7 |
| 10 | 0.02 | | | 0.01 | 0.03 | 10.0 | −5.5 | 4.5 | +5.5 | 10.0 | 8.5 | 10.0 |
| 11 | 0.02 | | | 0.02 | 0.04 | 10.5 | −3.5 | 6.0 | +6.0 | 12.0 | 7.6 | 11.2 |
| 12 | 0.02 | | | 0.03 | 0.05 | 11.0 | −3.0 | 7.0 | +8.0 | 15.0 | 6.9 | 12.3 |

[1] The percentages refer to the quantity of vinyl chloride used.
[2] See the following:
ACSP = Acetyl cyclohexyl sulfonyl peroxide.
TBPP = t-Butyl-peroxipivalate.
DLP = Dilaurylperoxide.
ABN = Azoisobutyric acid dinitrile.

The tests in Table 1 show that with the catalyst system of the present invention one can achieve a temperature profile between the reaction and cooling water temperature that varies within a few degrees. Thereby the available cooling capacity can be utilized almost in its entirety without any danger during the entire reaction period.

When compared with known catalyst combinations, our new catalyst system, with the lowest total concentration, gives the most favorable conversion/time conditions. Added to this is a considerable time gain during cleaning of the autoclave (by about 30% and more).

EXAMPLE 2

In accordance with the basic prescription shown in Example 1, tests 13 to 15 examined a catalyst combination of acetyl cyclohexane sulfonyl peroxide and 1,1,3,3-tetramethyl butylperoxi-2-ethylbutyrate, and tests 16 to 18 examined a combination of acetyl cyclohexane sulfonylperoxide and 1,1,3,3-tetramethyl butylperoxi-2-methylpentanoate. The result is shown in Table 2. Autoclave cleaning time about 1 hour.

is terminated. With a conversion of 85% a suspension polymerizate with a K value of 70 is obtained. The autoclave walls show only light deposits with low adhesive properties. For a cleaning with a spatula 1 hour was necessary.

EXAMPLE 4

The repitition of Example 3 with 0.0107% t-butylperpivalate and 0.011% acetyl cyclohexyl sulfonyl peroxide gives the following temperature profile: start 14° C., middle 12° C. and end 15° C. with a reaction period of 9¾ hours.

EXAMPLE 5

(a) As a comparative example the same starting substance as per Example 3 is catalyzed with 0.04% dilaurylperoxide and 0.01% acetylcyclohexyl sulfonyl peroxide. Under these conditions, 13.5 hours are needed to reach a pressure decrease of 1.0 atm. The temperature profile between cooling water and polymerization temperature shows the following values: start 14° C., middle 5° C., end 20° C. After completion of the polymerization the boiler lining shows moderate deposits which under comparable conditions were removed in 3 hours.

TABLE 2

| Test | Percent | | | | Start (°C.) | ΔT | Middle | ΔT | End | Reaction period (hr.) | Conversion per time (percent/hr.) |
|---|---|---|---|---|---|---|---|---|---|---|---|
| | ACSP[1] | TMEB[1] | TMMP[1] | Total | | | | | | | |
| 13 | 0.01 | 0.03 | | 0.04 | 12.0 | −1.0 | 11.0 | ±0.0 | 11.0 | 9.25 | 9.2 |
| 14 | 0.01 | 0.04 | | 0.05 | 12.0 | +2.0 | 14.0 | ±0.0 | 14.0 | 6.5 | 13.0 |
| 15 | 0.01 | 0.05 | | 0.06 | 15.0 | +1.0 | 16.0 | ±0.0 | 16.0 | 6.2 | 13.7 |
| 16 | 0.01 | | 0.03 | 0.04 | 11.5 | −0.5 | 11.0 | ±0.0 | 11.0 | 7.8 | 10.9 |
| 17 | 0.01 | | 0.04 | 0.05 | 14.0 | ±0.0 | 14.0 | −0.5 | 13.5 | 6.5 | 13.0 |
| 18 | 0.01 | | 0.05 | 0.06 | 14.0 | +2.0 | 16.0 | ±0.0 | 16.0 | 6.2 | 13.7 |

[1] See the following:
ACSP = Acetyl cyclohexane sulfonyl peroxide.
TMEB = 1,1,3,3-tetramethyl peroxi-2-ethylbutyrate.
TMMP = 1,1,3,3-tetramethyl peroxi-2-pentanoate.

EXAMPLE 3

63.6 parts of fully desalted water are placed into a V2A mixer autoclave. Dissolved in the water are 0.034 parts of a low-viscous polyvinyl alcohol with a saponification number of 270. After the air has been displaced by nitrogen, 36.3 parts vinyl chloride are added under stirring together with 0.0094% t-butylperpivalate and 0.01% acetyl cyclohexyl sulfonylperoxide (percent data referred to vinyl chloride). After heating up the reaction charge to 54° C. the polymerization begins immediately, as shown in the temperature difference between the polymerizate charge and the cooling water. During the first hour this temperature difference rises up to 15° C., then sinks slowly to 13° C., to rise at the end again to 15° C. As soon as the pressure in the autoclave decreases by 1.0 atmosphere, which takes place after 10 hours, the reaction (b) Also as a comparative example the polymerization deposit described in Example 3 alone is catalyzed with 0.1% dilaurylperoxide. The reaction, which requires 15 hours until the pressure decreases by 1.0 atm., shows the following temperature profile: start 1° C., middle 6° C., end 32° C. The available cooling capacity is not utilized during more than half of the reaction period, while it is used fully for a short while during the last phase. Such a polymerization method carries the danger of premature termination if the end reaction cannot be intercepted. Under comparable conditions the cleaning of the autoclave required 3½ hours.

(c) The same charge was likewise processed with 0.015% and with 0.025% acetyl cyclohexyl sulfonyl peroxide. The table below clearly shows the poor utilization of the capacity. The cleaning periods were 2½ hours.

TABLE 3

Difference between polymerization and cooling water

| Test | ACSP [1] (percent) | Start (°C.) | Middle (°C.) | End (°C.) | Reaction time (hr.) | Conversion (percent) |
|---|---|---|---|---|---|---|
| 1 | 0.015 | 10 | 1 | 1 | [2] 26.5 | 58 |
| 2 | 0.025 | 16 | 9 | 7 | 6.5 | 83 |

[1] ACSP=Acetyl cyclohexyl sulfonylperoxide.
[2] No pressure decrease.

EXAMPLE 6

The adhesive strength of the wall deposit in the autoclave during the copolymerization of vinyl chloride/vinyl ester is a special problem. Here the employment of the catalyst combination of the invention also proves to be useful.

Into a V2A autoclave equipped with a stirrer one places 62 parts of deionised water. Dissolved in the water are 0.17% of a low-viscous polyvinyl alcohol with a saponification factor 270, and 0.015% sodium bicarbonate. After displacing the air by nitrogen, 1.9 parts vinyl acetate and 36.1 parts vinyl chloride are added without stirring. The monomer phase contains 0.015% acetyl cyclohexyl sulfonyl peroxide and 0.01% t-butyl peroxipivalate in solution. (The percentages refer to the monomer percentage.)

While stirring (130 r.p.m.) the temperature is heated up to 54° C. Polymerization begins immediately after the desired reaction temperature has been reached. The biggest temperature difference between cooling water and reaction temperature within the first hour shows a difference of 10° C. This temperature difference sinks to 9° C. and rises to a maximum of 10° C. in the last reaction hour. After 7.5 hours the reaction is terminated with a pressure drop of 1.5 atm. The conversion amounts to 88%. The wall of the autoclave shows an easily adhering, moderate deposit which can be scraped off with a spatula in 1 hour.

EXAMPLE 7

As a comparative example, Example 6 was repeated but with 0.021% acetyl cyclohexyl sulfonyl peroxide and 0.035% dilaurylperoxide. The temperature profile between cooling water and reaction temperature has the following values here: start 11° C., middle 7.5° C., end 12° C. Although in this case the total catalyst concentration is more twice that in Example 5, the reaction period amounts to 9.5 hours until a pressure drop by 1.0 atm. occurs. There is a light but firmly adhering deposit on the boiler wall, which under comparable conditions could be removed after 3¼ hours.

The invention claimed is:

1. Process for polymerizing vinyl chloride, and for copolymerizing vinyl chloride and up to 30% by weight of vinyl acetate in aqueous phase containing a suspension agent, and a basic buffer which comprises heating the suspension to a temperature of 30 to 90° C., under a pressure of up to 15 atmospheres, in the presence of a mixture of acetyl cyclohexyl sulfonyl peroxide and a perester of branched carboxylic acids and α-branched hydroperoxides of the general formula

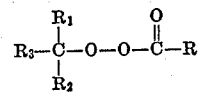

where R represents branched alkyl groups with 3 to 18 C atoms, $R_1$ hydrogen or alkyl groups with 1 to 4 C atoms, $R_2$ alkyl groups with 1 to 4 C atoms and $R_3$ straight-chain or branched alkyl groups with 1 to 18 C atoms, in which the molar proportion between acetyl cyclohexyl sulfonyl peroxide and perester is 3:1 to 1:5, and in which the acetyl cyclohexyl sulfonyl peroxide and perester are used in quantities of 0.01 to 0.1% by weight, referred to monomers.

References Cited

UNITED STATES PATENTS

| 2,975,162 | 3/1961 | Iloff | 260—92.8 W |
| 3,022,282 | 2/1962 | Marous et al. | 268—92.8 W |
| 3,205,204 | 9/1965 | Heckmaier et al. | 260—92.8 W |
| 3,592,800 | 7/1971 | Oschmann et al. | 260—92.8 W |
| 3,717,621 | 2/1973 | Hauss | 260—85.5 |

JOSEPH L. SCHOFER, Primary Examiner
R. S. BENJAMIN, Assistant Examiner

U.S. Cl. X.R.
260—92.8 W